F. D. SHELDON.
LOCOMOTIVE.
APPLICATION FILED AUG. 10, 1914.
1,164,760.
Patented Dec. 21, 1915.
5 SHEETS—SHEET 5.
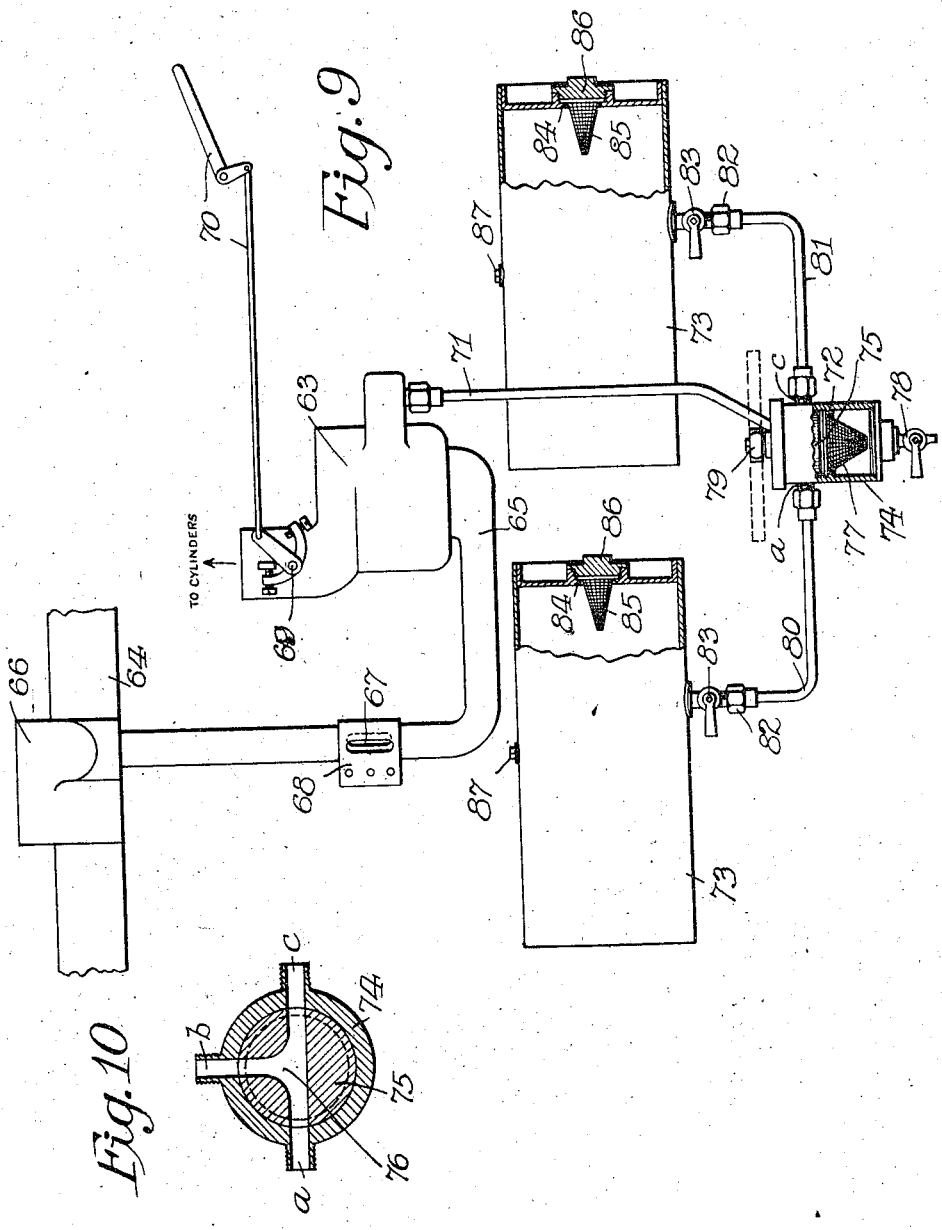
Witnesses:
Leonard W. Novander.
Edmund Price
Inventor
Frank D. Sheldon
By Brown, Hanson & Boettcher
Att'ys

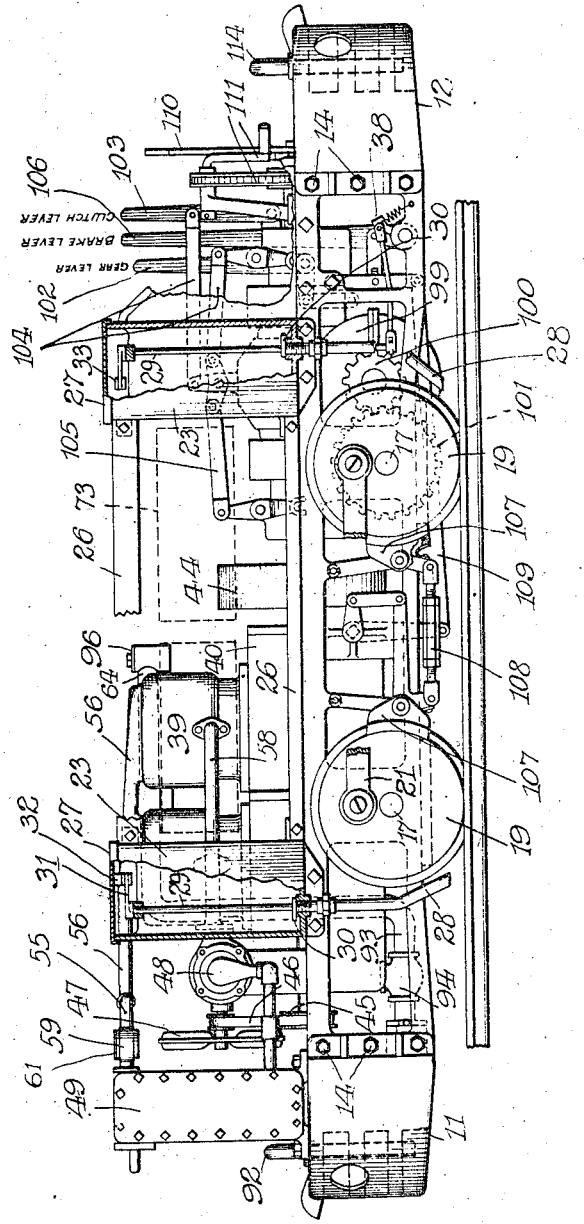

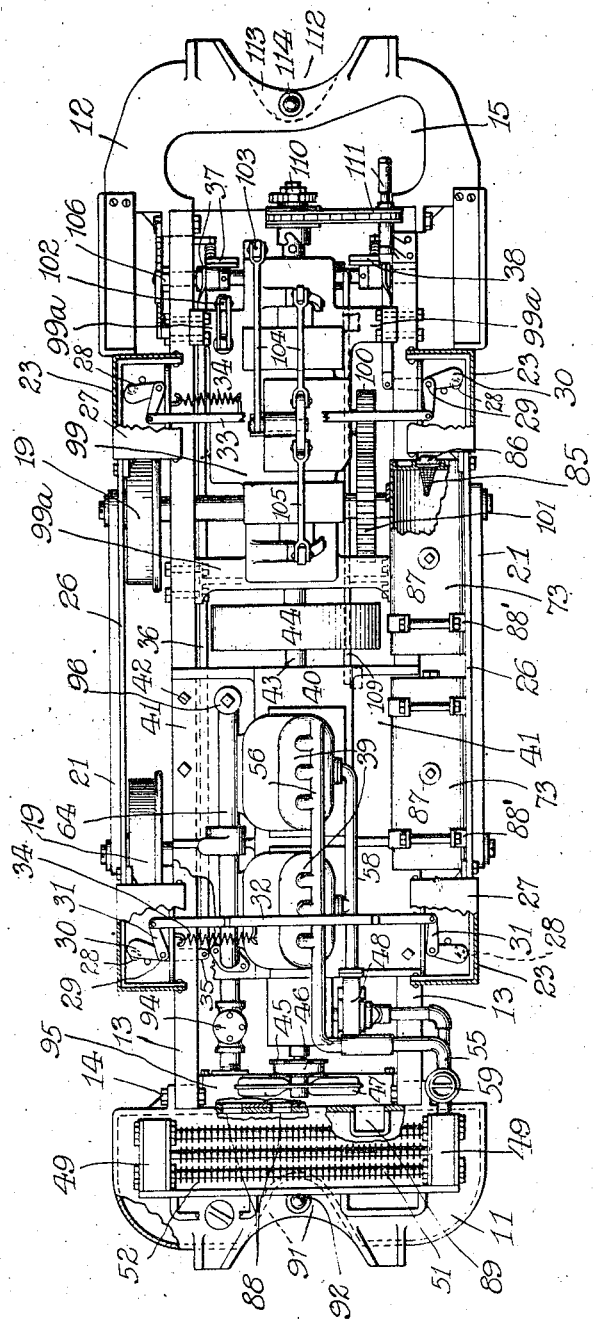

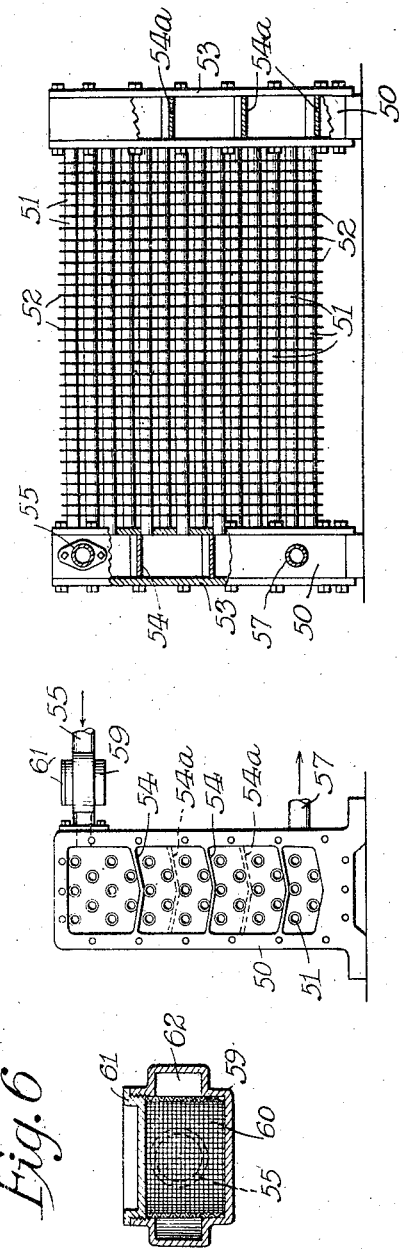

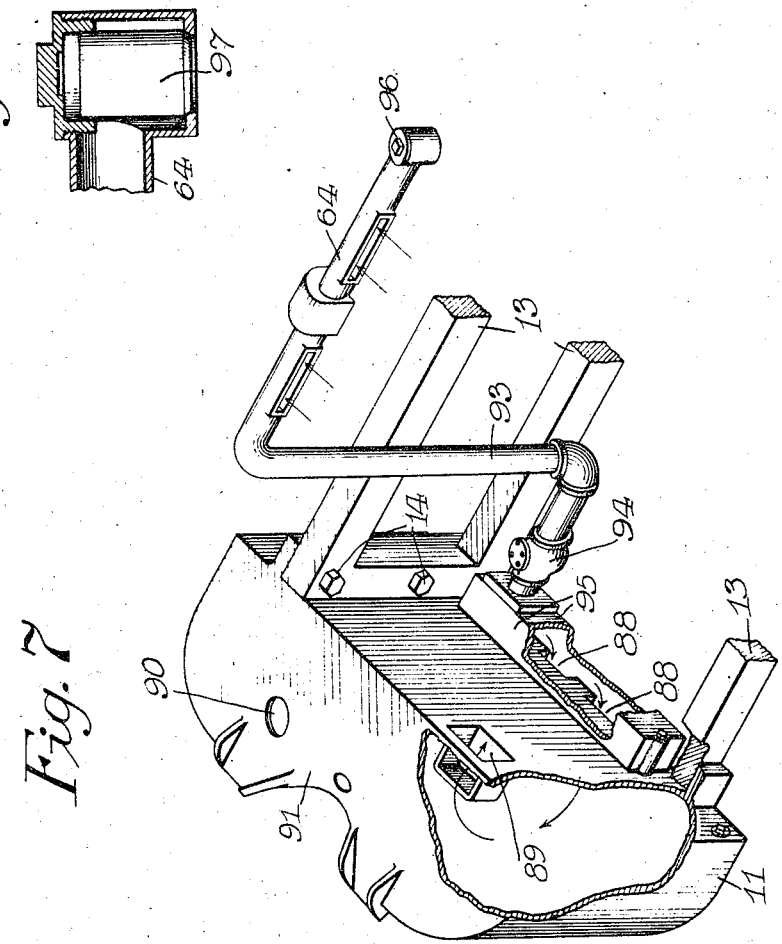

UNITED STATES PATENT OFFICE.

FRANK D. SHELDON, OF MILWAUKEE, WISCONSIN, ASSIGNOR TO MILWAUKEE LOCOMOTIVE MANUFACTURING COMPANY, OF MILWAUKEE, WISCONSIN, A CORPORATION OF WISCONSIN.

LOCOMOTIVE.

1,164,760.  Specification of Letters Patent.  Patented Dec. 21, 1915.

Application filed August 10, 1914. Serial No. 856,012.

*To all whom it may concern:*

Be it known that I, FRANK D. SHELDON, a citizen of the United States, residing at Milwaukee, in the county of Milwaukee and State of Wisconsin, have invented certain new and useful Improvements in Locomotives, of which the following is a full, clear, concise, and exact description, reference being had to the accompanying drawings, forming a part of this specification.

My invention relates to locomotives and is particularly concerned with that type of locomotive which is propelled by means of an internal combustion engine.

It is the object of my invention to provide a simple, sturdy and efficient structure, and to this end. I employ certain constructions and certain arrangements of parts which I make the subject matter of the appended claims. My experience with locomotives of this type has been mainly with locomotives for use in industrial establishments, such as mines, brickyards, lumber yards, etc., and it will appear that certain features of my invention are concerned with locomotives particularly adapted for this purpose, although it will appear that certain other features are useful and advantageous regardless of the particular use to which they are put.

The locomotive of my invention is illustrated in the accompanying drawings in which—

Figure 1 is a side elevational view thereof, parts of the housing being removed and parts being broken away so as to reveal the interior construction; Fig. 2 is a plan view thereof; Fig. 3 is a view of the frame-work stripped of the mountings; Fig. 4 is a rear elevational view of the radiator; Fig. 5 is an end elevational view thereof, the end plate being removed; Fig. 6 is a cross-sectional view of a strainer and filler which is employed; Fig. 7 is an isolated perspective view of the deodorizing system; Fig. 8 is a cross-sectional view of the relief valves which is employed in the deodorizing system; Fig. 9 is a more or less diagrammatic representation of the fuel supplying system; and Fig. 10 is a horizontal sectional view of a valve employed in this fuel supplying system.

Referring first to Fig. 3, it will be seen that the main supporting frame-work comprises a front end bumper 11 and a rear end bumper 12 between which a skeleton frame-work comprising the two side members 13—13 is secured by means of bolts 14—14, as will be seen by further reference to Fig. 2. The skeleton formation of these side pieces is of importance in that more or less weight may be employed in the structure, without change in over-all space, so that when more weight is required for tractive purposes, this may be easily provided for. It will be noted that these skeleton side pieces are straight and that they engage, end and end, with the bumper so that the strains are properly met and distributed. The front end bumper 11 forms the deodorizing tank, as will be described a little farther on, and rear end bumper 12 forms the pit 15 for the accommodation of the operator or driver. It will be noted from Fig. 1 that the control parts are all located within convenient reach of a person accommodated in this pit. These bumpers are preferably of steel.

Each of the skeleton side pieces 13 is provided with two stout vertical cross pieces 16—16 in which the front and rear axles 17 and 18, respectively, are mounted. The particular details of the mounting (which is usually a resilient one) do not form a part of my present invention and I shall not make any specific disclosure in this respect. Suffice it to say that these axles are mounted in these side pieces. The axles, of course, are mounted in car wheels 19—19, of the usual type, which run upon suitable rails 20. These car wheels operate together since they are mechanically united by means of a connecting rod 21, (Fig. 1) mounted upon eccentric pins 22—22.

The housing for the superstructure is defined in part by the positions of four sand boxes 23—23 which are located, two on each side piece 13, and in transverse alinement, one near the front and one near the rear of the frame. These sand boxes appear exteriorly in the form of corner posts which are secured on top of their respective side pieces by means of bolts 24—24 extending through downwardly extending flanges 25—25 thereon and into the side pieces themselves. Each pair of sand boxes is secured together by means of longitudinally extending bars 26—26. Each of these sand boxes is provided with a cover 27 and a downwardly extending pipe 28 leading from the bottom to a point in juxtaposition to the corresponding wheel. The sand pipes which lead downwardly from the forward sand boxes lead to a position in front of the wheels and the sand pipes which lead from the rear boxes go to a position in the rear of the wheels.

Each of the sand boxes has disposed therein a vertical rock shaft 29 at the bottom of which a fantail valve 30 controls the outlet with which the pipe 28 connects. At the top of each shaft 29 an arm 31 is provided and the two front arms 31 are connected together by a cross piece 32 while the rear arms 31 are connected together by cross arm 33. The fantail valves are all held in their closed positions by means of springs 34—34. One of the front shafts 29 is provided with a second arm 35 which, by means of a longitudinally extending rod 36, is connected with foot and hand lever mechanism 37 accessible from the pit 15. One of the rear shafts 29 is connected with foot and hand lever mechanism 38 accessible from the pit 15. The foot and hand lever mechanism 37 is actuated when the track is to be sanded in the forward movement of the locomotive and the foot lever mechanism 38 is actuated when the track is to be sanded in the rearward movement of the locomotive.

One of the important features of my invention lies in the arrangement of parts whereby all the elements which become hot, such as the engine, the radiator, and the deodorizer, are all located in a position as remote as possible from the operator's pit. This arrangement of parts is secured by making the end bumper a deodorizer tank and by mounting the radiator directly thereon, as will be described more fully presently, and furthermore, by disposing the engine immediately in back of the radiator. The deodorizer and radiator features make this compact arrangement possible and the operator is therefore effectively protected from the disagreeable heat of these parts. This is particularly significant in that the theory of the entire structure is one of compactness and one where the operator is likely to be brought too close to these parts. Particularly in mine locomotives this compactness is not only desirable but absolutely essential and the effect of hot parts upon the operator becomes all the more disagreeable.

The engine is illustrated at 39, the crank case being shown at 40, and, as illustrated, being provided with laterally extending flanges 41 which are bolted to the tops of the side pieces 13 by means of bolts 42. The engine shaft is illustrated at 43 and is provided with a fly-wheel 44 at one end and at the other end with a pulley 45 which by means of a belt 46, operates a fan 47 and by intermediate means a pump 48. The fan 47 is located directly in back of the tube radiator 49 which, as illustrated in Figs. 1 and 2, is bolted directly upon the top of the front end bumper 11 and which is illustrated in detail in Figs. 4, 5 and 6. The radiator 49 comprises the cast headers 50—50, between which a plurality of tubes or pipes 51—51 are secured, these tubes or pipes being provided with radiating fins 52—52.

The end plates 53—53 of the headers are removable so that the tubes may be cleaned, and the header is divided into compartments by means of partitions 54 and 54ª so as to force the water into a zigzag course in its passage through the radiator, so as to increase the efficiency of the radiator. The water enters the radiator at the top through a pipe 55 which comes from the outlet manifold 56 of the engine cylinder jackets and leaves the radiator at the bottom by means of a pipe 57 which leads to the pump 48 and from the pump 48 to the inlet manifold 58 of the engine cylinder jackets.

In the inlet pipe 55 a filler and strainer, illustrated in detail in Fig. 6, is interposed. This device is in the form of a casing 59 in which a cylindrical screen 60 is disposed, the top of this casing being provided with a cover 61 which, when removed, permits the introduction of the water. When the water is introduced in this way it is of course filtered by the screen in passing into the system. An annular channel 62 surrounds the screen 60 and directly connects the two attached parts of the inlet pipe 55 so that the screen, while it filters the water in its initial introduction, has nothing to do with the circulation in the system itself, the water passing around the circular screen by way of the annular channel 62 in case the screen should be clogged. The cooling system has no opening to the atmosphere—it is a closed system and, hence, entails small loss in water.

I shall now refer to the fuel supply system which is diagrammatically illustrated in Fig. 9, since certain parts thereof are hidden in Figs. 1 and 2. The carbureter 63 is disposed below the exhaust manifold 64, which will be referred to later. This carbureter receives its air through a pipe 65 (Fig. 9) and this pipe leads downwardly from the jacket 66 (Figs. 2 and 9) which surrounds the exhaust manifold and through which air is taken and is heated by the heat of the manifold. This hot air is cooled by means of cold air entering in a side opening 67 in the pipe 65, this side opening being controlled by a valve 68. The outlet of the carbureter, which leads to the intake manifold of the engine cylinders, is provided with a throttle valve mounted upon a shaft 69 which, by means of suitable linkages 70—70, is controlled from the operator's position. The gasolene, or other liquid fuel, is led to the carbureter by means of a pipe 71 which leads from a four-way valve 72 located near the fuel tanks 73—73 which, as illustrated in dotted lines in Fig. 1, are disposed between the sand boxes on one side of the locomotive. The four-way valve is shown in detail in Fig. 10 where it will be seen that it comprises an outer casing 74 and a rotatable plug 75. The casing is provided with three openings *a*, *b* and *c*, *a* and *c* being diametrically opposite and *b* being at right angles and midway between, and the plug 75 is provided with a T-passageway 76 so that the following conditions may exist: First *a*, *b* and *c* may all be connected together; second, *a* and *b* may be connected together and *c* shut off; third, *b* and *c* may be connected together and *a* shut off; fourth, *b* shut off entirely. Thus, either or both tanks may be connected with the carbureter or both of them may be cut off therefrom. The valve chamber is provided with a conical strainer 77 and with a drain 78. A handle 79 is connected with the plug so as to secure the adjustment into the various positions. The opening *a* is connected by means of a pipe 80 with one of the tanks 73 and the opening *c* is connected by a pipe 81 with the other tank 73. Each of these tanks is removable from the pipes which are stationarily installed, by loosening the couplings 82—82 and in each case a cock 83 is provided. The tanks are filled by means of openings 84—84 in which strainers 85—85 are disposed and which are tightly closed by means of screw plugs 86—86. A vent 87 is provided for each tank, this vent being opened after the tank is put in place. As illustrated in dotted lines in Fig. 1 and in full lines in Fig. 2, these tanks are disposed end to end between the two sand boxes on one side of the locomotive and so nearly fill the space therebetween that it is impossible to secure access to the filler plugs 86 without removing the tanks from their supports and connections. The tanks are supported by means of straps 88 and it is merely necessary to untighten these straps and to loosen the couplings 82 in order to remove them. However, the filler plug of one tank is placed so close to the sand box that it is protected thereby and the filler plug of the second tank is disposed so close to the end of the first tank that it is protected thereby, or preferably by the other sand box, and it is necessary for the operator therefore to remove the tanks before he can fill them. The object of this is to make it no easier to bring a supply tank of gasolene into a mine than it is to take these tanks out of the mine, and fill them in the open air.

In Fig. 7 I have illustrated in detail the front end bumper 11 which will be seen to be in the form of a tank having the inlet passageways 88 and the outlet passageways 89. A filling opening 90 is also provided. The tank of course is properly shaped so as to make room for the coupling flanges 91—91 and the coupling pin 92. This tank is filled, or nearly filled, with water or some special deodorizing fluid or substance, and the exhaust gases are led from the exhaust manifold 64, which is above the level of the liquid in the deodorizing tank, and down the pipe 93, through a check-valve 94, and into the header 95 leading to the openings 88. The header is in the nature of a distributing head for spreading the gases into the deodorizer. A relief valve 96, shown in detail in Fig. 8, is disposed in the exhaust manifold 64, the valve member 97 being weighted and opposed in its opening movement by gravity. After the vacuum has reached a certain point, it is broken by the opening of this valve.

The engine shaft 43 passes rearwardly into the transmission casing 99 secured between the side frames by means of supporting parts 99ᵃ—99ᵃ. My invention is not concerned with the details of this transmission. Suffice it to say that it connects the shaft 43 operatively and under control with the pinion 100 which meshes with the gear 101 on the rear axle. The transmission, which includes the clutches and the change gears, is controlled by means of the gear lever 102 and the clutch lever 103 connected by means of suitable linkages 104, 105 with the movable parts of the transmission. A brake lever 106 is operatively connected with the brake shoes 107—107 by means of linkages 108, 109. All these levers, together with the starting devices 110 and 111, are within easy access of a person accommodated in the operator's pit 15.

The rear bumper, as in the case of the front bumper, is provided with a coupling socket 112, the coupling flanges 113 and the coupling pin 114.

The various parts of the superstructure are preferably surrounded by a suitable housing connecting up the sand boxes and the radiator and a top over-all is also desirable.

While the particular details of the transmission, the brake mechanism, and the starting devices, do not form part of the subject matter of the present invention, the arrangement of the parts and their relations to certain other parts, so far as described herein, do form part of the subject matter of this invention.

In the appended claims I define the various features which are of the essence of my invention, which are novel, and which I desire to secure by Letters Patent.

I claim:

1. In a locomotive, front and rear end bumpers, a framework between them, one of said bumpers being hollow to form a deodorizing tank, and an engine carried by said framework and having its exhaust connected with said deodorizing tank.

2. In a locomotive, front and rear end bumpers, a framework between them and operating mechanism carried by said framework, one of said bumpers being formed into a pit to accommodate an operator.

3. In a locomotive, front and rear end bumpers, a skeleton framework between them, and a superstructure secured to said framework, the front bumper forming a deodorizing tank and the rear bumper forming a pit to accommodate an operator.

4. In a locomotive, front and rear end bumpers, a skeleton framework between them, posts forming sand boxes rectangularly arranged on said framework, and a housing between said posts.

5. In a locomotive, front and rear end bumpers, a skeleton framework between them, posts forming sand boxes rectangularly arranged on said framework, a housing between said posts, and means for controlling the outlets from said sand boxes.

6. In a locomotive, front and rear end bumpers, a skeleton framework between them, axles mounted in said framework, wheels on said axles, four posts rectangularly arranged to said framework and forming sand boxes, a pipe leading from each sand box to a position next a wheel, and means for controlling the outlets from said sand boxes.

7. In a locomotive, front and rear end bumpers, a skeleton framework between them, axles mounted in said framework, wheels on said axles, four posts rectangularly arranged to said framework and forming sand boxes, housings between said posts, a pipe leading from each sand box to a position next a wheel, and means for controlling the outlets from said sand boxes.

8. In a locomotive, hollow cast metal front and rear end bumpers, a skeleton framework between them, axles mounted in said framework, wheels on said axles, and an engine on said framework operatively connected to said wheels, the exhaust from said engine passing through one of said hollow bumpers.

9. In a locomotive, front and rear end bumpers, a skeleton framework between them, axles mounted in said framework, wheels on said axles, an engine on said framework near the front thereof, a radiator on the front bumper, means connecting said radiator with the jacket of said engine, and a deodorizer compartment within the front bumper, said deodorizer compartment being connected with the engine exhaust.

10. In a locomotive, front and rear end bumpers, a skeleton framework between them, axles mounted in said framework, wheels on said axles, an engine on said framework near the front thereof, a radiator on the front bumper, means connecting said radiator with the jacket of said engine, a deodorizer compartment within the front bumper, said deodorizer compartment being connected with the engine exhaust, and control means at the rear end of said framework, the rear bumper having a pit to accommodate an operator.

11. In a locomotive, a framework, an engine, a radiator and a deodorizer for the engine exhaust located at the front thereof, and control means located at the rear thereof.

12. In a locomotive, a framework having a place at the rear thereof for the accommodation of an operator, an engine toward the front thereof, a radiator at the front thereof connected with the water jacket of the engine, a deodorizer at the front thereof connected with the exhaust of the engine, clutches and transmission gear mechanism carried on said framework toward the rear thereof, and a gear lever, a brake lever and a clutch lever at the rear thereof.

13. In a locomotive, a fuel tank, a filler in the end of said tank, means for mounting said tank so that said filler will be covered by a portion of the framework so as to make the filler inaccessible without removing the tank from the locomotive.

14. In a locomotive, a pair of fuel tanks, a carbureter, and a four-way valve controlling the connection between said tanks and said carbureter so that either or both of said tanks may be connected therewith or entirely cut off therefrom.

15. In a locomotive, hollow cast metal front and rear end bumpers, a framework between them, and a superstructure secured to said framework.

16. In a locomotive, front and rear end bumpers, a framework between them, posts forming sand boxes arranged on said framework, and a housing between said posts.

17. In a locomotive, hollow cast metal front and rear end bumpers, a skeleton framework between them, axles mounted in said framework, wheels on said axles, a motor on said framework, and means on said framework for operatively connecting said motor to said wheels.

18. In a locomotive, front and rear end bumpers, a skeleton framework between them, axles mounted in said framework, wheels on said axles, an engine on said framework near the front thereof, a radiator on the front bumper, means connecting said radiator with the jacket on said engine, a deodorizer compartment within the front bumper, said deodorizer compartment being connected with the engine exhaust, and control means at the rear end of said framework.

19. In a locomotive, a framework, front and rear end bumpers, an engine, a radiator and a deodorizer for the engine exhaust located at the front thereof, and control means located at the rear thereof, the rear bumper having a pit to accommodate an operator, said control means being accessible to the operator.

In witness whereof, I hereutno subscribe my name this 6th day of August, A. D. 1914.

FRANK D. SHELDON.

Witnesses:
R. P. SELL,
R. H. WEILAND.